March 1, 1966  H. C. RICE  3,237,339
FISHING TANK
Filed Dec. 12, 1961
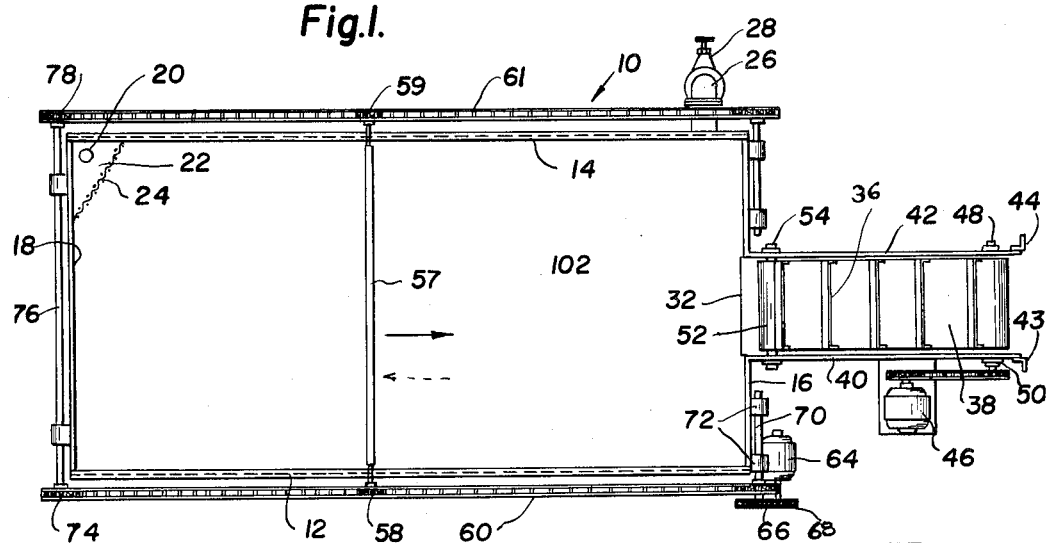
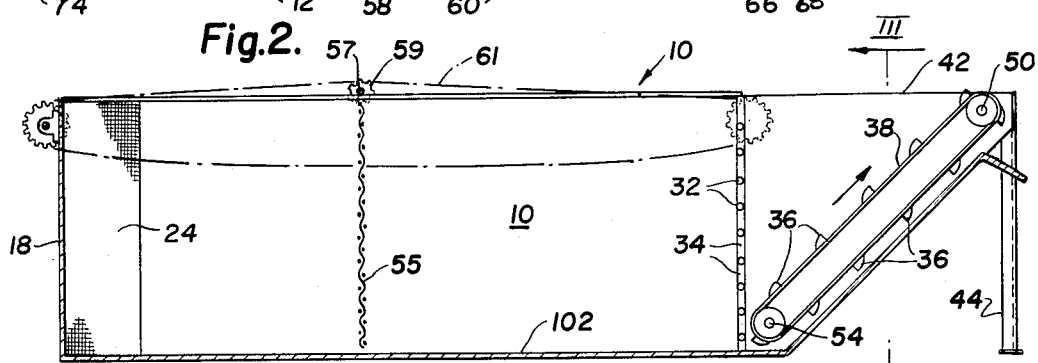
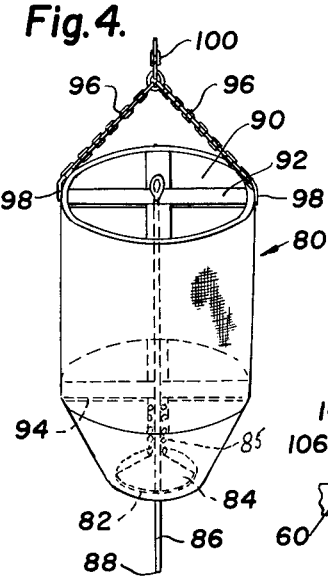
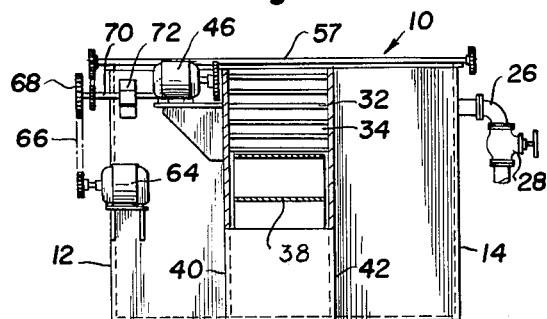
INVENTOR.
HARRY C. RICE
BY Murray and Young
his ATTORNEYS.

United States Patent Office 3,237,339
Patented Mar. 1, 1966

3,237,339
FISHING TANK
Harry C. Rice, 1811 N. Brookfield, South Bend, Ind.
Filed Dec. 12, 1961, Ser. No. 158,854
2 Claims. (Cl. 43—44.99)

This invention relates to a fishing tank which is used for containing bait fish or the like and is especially adapted for use with the automatic fishing apparatus which is disclosed in my copending application filed concurrently herewith and entitled "Automatic Fishing Apparatus," filed December 12, 1961, application Serial No. 158,857 and now Patent No. 3,192,659. The described usage is however only one proposed application of my invention and is not limited to this application.

When a school of tuna or other valuable catch fish is sighted, the fishing operation must continue as swiftly as possible because the school is constantly in motion and the fishing ship must make its catch while it is within the area of the school. This means, that within a relatively brief time the school must be attracted, and must be held to a fishing area within the range of the boat during which time the haul is made. For best results therefore I count on maximum speed for hooking and landing fish during the brief time that the fishing boat is maneuvered into catch position with respect to the school of fish.

It is an object of the present invention to provide a mechanized system whereby bait fish can be stored and preserved for future use on board the fishing vessel until they are ready for discharge overboard to attract the school of fish such as tuna or the like.

It is a further object of the invention, to handle the bait fish or "chums," as they are sometimes referred to, in as careful manner as possible so that relatively few of them are killed or injured either by the process of catching them or storing them pending usage, with the result being that less maintenance is required of the storage tank to clean out and decontaminate the tank because of dead fish or decaying fish matter.

It is a further object of the invention to provide a mechanized chum discharge mechanism which will continuously, and automatically discharge chum fish overboard in controlled quantities so that once the fishing vessel has moved into catch position with respect to the school, the constant feeding of bait fish into the fishing waters, will attract the attention and hold the attention of the school of fish to maximize the fishing period during which the fishing operation is productive.

It is a further object of the invention, to provide a fishing operation bait-feeding apparatus which will handle the bait fish with the slightest possible damage so that when they are discharged overboard their swimming movement will attract and hold the attention of the school of fish which are drawn to the bait and hooks for catching them.

It is another object of the invention to discharge overboard at a substantially constant rate, a quantity of bait fish, in spite of the quantity which are available. Thus, the rate of discharging fish overboard is directly proportional to the rate of operation of said discharge means which is regulatable by the operator and the bait discharge can be operated slowly, to effect a general attraction, and then can be speeded up in the direct vicinity of the school to provide a high density of bait, holding the attention of the school and thereby increasing the productive period of fishing.

Another object of the invention is to provide a novel charging mechanism by which the bait fish, which are net captured, can be retrieved and transported to the storage tank and there unloaded. All of these operations occur with substantial speed, require only a single operator to perform them, and are carried out with minimal damage to the bait fish. I thereby effect a semi-automatic loading of the bait fish and automatic discharging of the fish in accordance with the fishing operation.

Other objects and features of the invention will become apparent from a consideration of the following description, which proceeds with reference to the accompanying drawings, wherein:

FIGURE 1 is a plan view of the storage tank and its accompanying discharge apparatus for feeding the bait overboard;
FIG. 2 is a sectional view of the tank shown in FIG. 1;
FIG. 3 is an end view of the fishing tank;
FIG. 4 is a detail view of the bucket for retrieving bait fish while they are held within the net and then unloading them within the tank; and
FIG. 5 is a detail view of the chain drive.

Referring now to the drawings, the tank, designated generally by reference numeral 10, is located at any convenient location on board the ship, the general location being at the port and starboard side of the forward deck of the ship. There is generally provided two such storage tanks. For a typical showing of suitable placement of the tanks reference may be made to FIG. 1 in my copending application, previously incorporated herein by reference, which clearly discloses the location and relative size of the tank in relation to the fishing vessel. Although two tanks are provided in the arrangement shown in my copending application, it should be understood that the number of tanks is not critical to the invention nor is the relative size of the tanks.

The tank 10 usually is of rectangular cross section and consists of corrosion resistant material or is suitably lined or painted to resist deterioration by the salt water which is charged within the tank to hold the chum fish. The tank has a depth of about 3½ to 6 feet or so and holds typically about 300 to 600 cubic feet of water. The side walls 12, 14 and the end walls 16, 18 are reinforceable by gusset plates (not shown) secured to the deck to prevent buckling of the walls when the tank is filled.

At the corner 22 of the tank between side wall 14 and end wall 18 is a sump drain 20 which is protected by a screen 24 to allow for drainage of water from the tank and replacement thereof by fresh sea water since it is my experience that a thick, slime residue is inadvertently brought in with the chum when the chum is first captured, and it is desirable to eliminate this material to prevent putrescence within the tank and as a result, it is possible to go for longer periods without cleaning out the tank between catches of the chum fish. Because of the cleaner conditions within the tank, the chum fish are retained for longer periods of time in a healthy condition within the tank.

The incoming water is provided from an inlet line 26 which charges the tank with fresh sea water and is controlled by a hand valve 28, the inflow of fresh sea water being from a pump or the like (not shown).

Within end wall 16 there is provided a cutout which is strengthened by a series of reinforcing bars 32 which are spaced to leave a gap 34 to permit chum to swim through freely.

A number of troughs 36 are supported at spaced intervals on a continuously traveling belt 38, said troughs 36 being movable downwardly within the tank, to the bottom portion thereof and then upwardly to carry ensnared fish therein in the direction indicated by the solid line arrow in FIG. 2. The buckets may be perforated to drain any sea water out of the bucket and separate such water from the fish in order not to deplete the water within the tank 10. Two spaced guide plates 40 and 42 form a chute to provide support for the belt 38 and its attached buckets 36 and also to channel spillage of bait and water down to the tank should any be jostled out of the bucket troughs 36. The chute is supported by two pedestals 43 and 44 and the belt 38 is turned continuously by a motor 46 which actuates the belt 38 journaled at its upper end 48 on shaft 50 and at the lower end 52 on shaft 54. The buckets 36 are turned so that their open ends face upwardly as they travel from the lower to the upper end of the tank to be filled with water and chum and when they reach the turn-around shaft 50 they discharge their contents into a conduit, chute, pipe or the like (not shown) which directs the chum overboard where the chum then attract a school of tuna or other fish being sought.

With continued running of the belt 38, it is easy to see that with the tank filled with fish there will be a heavy discharge of bait fish at the beginning but as the tank becomes depleted, the discharge rate will become less. To correct for this depletion, I provide that the portion of the tank through which the troughs travel, will retain a substantially constant density of chum fish even though said chum fish are being constantly withdrawn and discharged over the side of the ship. For this purpose, I provide a screen 55 which is supported by a cross-rod 57 and having pinion gears 58 and 59 at its opposite ends which are meshed respectively with drive chains 60 and 61. The screen 55 hangs downwardly of its own weight and substantially fills a cross-sectional dimension of the tank so that as it moves in the direction of the solid line arrow in FIG. 1 it will force the chum fish into an ever decreasing volume but allow water to pass freely through the net, with the result being that the density of chum between the end wall 16 and the screen net 55 remains substantially the same to compensate for withdrawal of the chum and therefore, assuming a constant rate of movement of the bucket troughs 36 through the tank, the rate of discharge of chum fish will not greatly vary. Therefore, it is possible to provide a rate of chum discharge which is a direct function of the rate of speed of the motor 46 effecting movement of the belt 38 and its attached buckets 36. Since these operations are performed remotely, from the wheel house by the captain of the vessel, it is possible at any time during the fishing operation to speed up, reduce, or maintain constant the rate of chum feed to attract, hold, or break off contact with the school of tuna or other quarry fish.

Screen 55 is actuated by a gear reduction motor 64 which acts through a gear reduction chain 66 then onto an idler wheel 68 journaled on shaft 70 and supported by brackets 72. Idler wheel 68 then drives chain 60 which in turn is fastened to a sprocket wheel 74 having a cross-shaft 76, and drive wheel 78 connected therewith, in turn is fastened to chain 61 and effects movement thereof. Thus, the motor 64 produces movement of both chains 60, 61 which in turn rotate the pinion gears 58, 59 causing advancing movement of the screen 55 at its opposite support ends. The rate of movement of the screen 55 by the motor 64 is coordinated with actuation of the motor 46 so that the rate of decrease in volume of the tank between end wall 16 and screen 55 is in direct proportion with the linear movement of bucket troughs 36 through the tank; and in this way, the same density level of chum fish is maintained for the tank volume through which the discharge bucket troughs 36 travel. This can be readily seen because in order to maintain the density of fish in advance of the screen 55 it is necessary to crowd the fish at a prescribed rate into a decreasing volume as a direct function of the withdrawal of fish to accomplish maintenance of density level.

To load the fish within the tank I use a bucket designated generally by reference numeral 80 in FIG. 4. There is an opening 82 in the bottom of the bucket 80 which is controlled by a foot valve 84 operated by a rod 86 having a rounded end 88 permitting it to pass freely through openings of a net without producing damage. When necessary, said net is gathered around a quantity of small chum fish which are used for bait (neither the net nor fishing method using the net are part of the present invention). The bucket 80 is immersed in the water and the open end 90 is filled with a draft of ocean water and chum. The shape of the bucket is maintained by two reinforcing members 92 and 94 at the top and bottom of the bucket interior to prevent collapsing of the sides of the bucket, the central portion of the reinforcing members providing slidable engagement for the rod 86 which is guided for vertical reciprocable movement between a lower limit of vertical movement wherein the foot valve 84 engages the bottom of the bucket and an upper position in which the foot valve 84 engages the reinforcement member 94. The bucket 80 is carried by a lift chain 96 fastened at 98 to the edge of the bucket 80 and is supported mid-length by a lift cable 100 or the like cooperatively associated with a derrick (not shown) on board the ship.

In operation, a plurality of bait fish are first gathered within a net and the bucket 80 is then lowered within the net (the rod end 88 passing freely through the net if necessary), the bucket then dips out ocean water and bait fish which are then carried over to the tank 10. While the tank 10 is being loaded, the screen 55 is normally positioned as closely as possible to the end wall 18. That is, the screen 55 is moved in the direction of the dotted line arrow in FIG. 1 to be closer to the end wall 18.

When the bucket 80 is lowered into the tank 10, end 88 of rod 86 engages the bottom 102 of the tank lifting foot valve 84 and discharging the contents of the bucket 80 through opening 82, said contents including both fish and sea water. The length of the rod 86 is proportioned to be greater than the depth of the tank so that the valve is lifted before the bucket becomes immersed.

The chum are thus maintained within water of the same temperature and of approximately the same environment from which they came so that minimum shock occurs to the fish thereby maintaining a healthy condition thereof. Also, the process of loading the bucket 80 with fish and subsequently unloading them within the tank 10 effects minimal damage to the fish so that the survival rate within the tank 10 is much higher than charging the tank directly with the nets which tend to crush the fish in the process of transporting them from the sea into the tank.

After the tank 10 is filled with fish, and during charging thereof, fresh sea water may be continuously cycled to the tank, being discharged from the sump 22 and the tank recharged through 26 to provide a continuous or discontinuous circulation of sea water which is free of algae, oils, and other putrescence-producing materials.

When the tank 10 has been charged sufficiently, the bucket dipping operation is discontinued and the dumping of bait fish overboard then commences in the vicinity of schools of the quarry fish at the fishing banks or whenever they are sighted by detection methods.

The chum feeding commences by operating motor 46 to start the movement of the buckets 36 through the tank 10, the buckets 36 in the process of moving through the tank picking up quantities of sea water and fish and discharging them at the turn-around point which is located at the upper end of the belt 38 and the fish are then fed into chutes or other guide means (not shown) and dumped overboard. The quantity of bait fish which are fed overboard is a direct function of the rate of movement of the buckets 36 through the tank, i.e., the faster the buckets are traversed through the tank the more bait fish are fed overboard and vice versa, the slower the speed of the bucket 36 movement the fewer bait fish are dumped overboard.

Because the bait fish are constantly removed from the tank, there is a possibility of depleting the tank and thereby so reducing the density level of fish that the rate of bait feed is no longer proportional to the rate of movement of buckets 36.

Therefore, the screen 55 is actuated accordingly with the movement of the buckets 36 by means of the motor 64 such that chains 60 and 61 acting in combination with pinion wheels 58, 59 traverse the screen 55 from end wall 18 toward end wall 16 crowding the remaining fish in decreasing volume in order to compensate for the decreasing number of fish. In this way, the density of chum fish remaining in advance of the screen 55 remains substantially constant and the rate of bait feeding remains proportional to the rate of actuation of the motor 46. The fishing captain thereby has at his disposal, a controllable means for dispensing bait fish in whatever quantity is consistent with best fishing results. That is, while a school of tuna, or other quarry fish is being attracted, the rate of dispensing bait fish can be slackened in order to conserve the bait fish, but once a rich strike area is found, the dispensing of chum fish can be increased and maintained at an increased level to maintain the presence of the school of fish during which time fishing commences and is maintained automatically.

Another important advantage of the invention is that since the bait fish are handled with minimum damage to the fish, only a few of them are killed and therefore it is possible to continue for longer periods of time without cleaning out the tank 10. Also, since there is a controlled circulation of sea water through the tank to remove contaminants and to maintain a high purity level within the tank greater survival conditions for the fish are maintained while they are stored pending usage.

This invention is also useful in catching food fish such as sardines in which case the sardines are transferred to the tank or the hold of the ship and are then transported to the cannery. The processes now used in unloading a fishing net are tedious and time consuming and my invention speeds up the process of fish transfer from net to hold to effect economies of handling the fish.

In use the foot valve is held seated by a soft spring 85 which is held compressed between reinforcement 84 and the outer face of the foot valve 84.

Although the present invention has been illustrated and described in connection with a single example embodiment it will be understood that this is illustrative of the invention and is in no sense restrictive thereof. It is reasonably to be expected therefore that those skilled in the art can make numerous revisions and adaptations of the invention to suit individual design requirements. It is intended that such revisions of the invention which incorporate the herein disclosed principle will be included within the scope of the following claims as equivalents of the invention.

I claim as my invention:

1. A chumming tank for receiving and storing small bait fish comprising a fluid chamber having a movable fluid-pervious wall having supporting elements at the opposite ends thereof and supported at the edges of said tank and dividing the chamber into two variable volume chambers, at least one of which is adapted to receive bait fish and adapted to be decreased in volume as fish are extracted to provide a controllable fish density, motor means for actuating said fluid-pervious wall at a controllable rate to provide automatic regulation of the fish density, means for dispensing fish from said chamber and combined with the variable volume chamber of decreasing volume, and means for regulating the rate of operation of said dispensing means in coordination with said motor means to provide for fish discharge at a controlled rate.

2. A chumming tank for receiving and storing small bait fish comprising a fluid chamber having a movable fluid-pervious wall having supporting elements at the opposite ends thereof and supported at the edges of said tank and dividing the chamber into two variable volume chambers, at least one of which is adapted to receive bait fish and adapted to be decreased in volume as fish are extracted to provide a controllable fish density, means for dispensing fish from said chamber and combined with the variable volume chamber of decreasing volume, regulatable means for actuating said movable wall to decrease the volume of said chamber having fish extracted therefrom to provide an adequate concentration level of fish, and means for catching and withdrawing fish from the reducing volume chamber and including continuously regulatable travelling conveyor means which travel at a predetermined and controllable rate through said tank, and a plurality of fish-catching elements carried thereon and adapted to secure fish as they move continuously through said tank to provide a discharge of fish at a preferred rate in accordance with the coordinated rates of movement of said movable wall and said conveyor means.

References Cited by the Examiner

UNITED STATES PATENTS

| | | | |
|---|---|---|---|
| 532,685 | 1/1895 | Moremen | 294—72 |
| 742,451 | 10/1903 | Ladley | 294—72 |
| 848,101 | 3/1907 | Hale | 43—44.99 X |
| 1,252,500 | 1/1918 | Schnoor | 119—5 |
| 2,582,015 | 1/1952 | Duncan | 43—44.99 |

FOREIGN PATENTS

| | | |
|---|---|---|
| 1,188,136 | 3/1959 | France. |
| 41,107 | 3/1925 | Norway. |

SAMUEL KOREN, *Primary Examiner.*

ABRAHAM G. STONE, *Examiner.*

L. O. MAASSEL, W. H. CAMP, *Assistant Examiners.*